United States Patent [19]

Horowitz et al.

[11] 3,767,852

[45] Oct. 23, 1973

[54] STABILIZING SYSTEM FOR FILM SCANNER

[75] Inventors: Harvey M. Horowitz, Easton; Saul M. Decker, Stamford; Renville H. McMann, New Canaan, all of Conn.

[73] Assignee: Columbia Broadcasting System, Inc., New York, N.Y.

[22] Filed: June 26, 1972

[21] Appl. No.: 266,453

[52] U.S. Cl. .......................... 178/7.2, 178/DIG. 28

[51] Int. Cl. .......................................... H04n 5/36

[58] Field of Search ...................... 178/7.2, DIG. 28

[56] References Cited

UNITED STATES PATENTS 2,922,841 1/1960 Graziano ...................... 178/DIG. 28

*Primary Examiner*—Richard Murray
*Attorney*—Spencer E. Olson et al.

[57] ABSTRACT

This disclosure applies to an apparatus for scanning a film having a succession of frames along its length, the apparatus including a film transport for moving the film at a substantially uniform rate past a scanning position, means for electronically scanning the frames at the scanning position, and means for initially registering each frame to be scanned with the scanning beam. There is disclosed an improved system for continuously retaining registration between a particular frame being scanned and the scanning beam. Means are provided for continuously sensing changes in the velocity of the film during scanning of the particular frame and for generating a velocity error signal indicative of said changes. Further means are provided for accumulating values of the velocity error signal to produce a displacement error signal representative of the distance by by which velocity changes have displaced the particular film frame with respect to its initial registration with the scanning beam. Finally, means are provided for continuously correcting the scanning beam position in accordance with the displacement error signal. In a preferred embodiment of the invention, the correcting means includes an auxiliary deflection yoke for the scanning tube, the yoke receiving correction signals from both a dynamic framing circuit and the displacement error circuit.

12 Claims, 4 Drawing Figures

PATENTED OCT 23 1973 3,767,852

STABILIZING SYSTEM FOR FILM SCANNER

BACKGROUND OF THE INVENTION

This invention relates to electronic systems for the reproduction of information recorded on a photographic film and, more particularly, to such a system having improved vertical stability in a reproduced video display.

It is well known that information recorded in a succession of frames on a photographic film can be scanned electronically such as by a flying spot scanner to provide an electrical output signal representative of scanned information and can be reproduced on a display such as a television receiver. A particularly effective system for recording picture information on photographic film is known as electronic video recording (EVR), wherein picture information is recorded in successive frames and the television picture reproduced from this film by means of electronic scanning and processing of resulting video signals. Both monochrome and color pictures can be recorded and reproduced by electronic video recording techniques.

In the case of monochrome pictures, the film contains a picture track comprising a succession of photographic frames with a sound track disposed along the film. For color recording, two picture tracks are provided along the film, one track being a luminance track comprising a succession of monochrome frames, the other track being a color track containing frames of encoded chroma information. In both monochrome and color recording, a synchronization track is provided along the film and generally includes an aperture in alignment with each frame from which synchronization signals are derived. To reproduce the recorded picture information, the recorded frames are each scanned in a raster pattern compatible with a conventional television receiver, and a video signal generated to cause display of the scanned picture on the television receiver.

In one version of the EVR system, the film is scanned while moving by a flying spot that follows the direction of the film motion but at twice the film velocity. The vertical scan starts at the top of a frame and at the end of one-sixtieth second reaches the bottom of the frame. In this time the film moves one frame and the scan moves a vertical distance equivalent to about the height of two frames. During vertical blanking, the spot returns to its original position to start the process over again on the next film frame. This technique, as well as an overall description of the EVR system, can be found in an article entitled "Color EVR" which appeared in the Sept. 1970 issue of IEEE Spectrum.

The described type of electronic video recording system can produce stable pictures when a high quality film is transported at a constant velocity past the electronic scanner. However, even small deficiencies in the quality of the film and variations in the scanner can cause noticable vertical jitter in a displayed picture. This jitter is brought about, for example, by variations in the velocity of the moving film or from non-uniform spacing of the recorded frames and associated synchronization marks on the film. In the co-pending U.S. Pat. application Ser. No. 200,786 of H. Horowitz and R. McMann entitled "Film Scanning System Having Improved Vertical Stability" that was filed on Nov. 22, 1971 and assigned to the same asignee as the present application, there is disclosed a technique for reducing vertical jitter in a film scanning system. Briefly, that application discloses an improved film transport servo system that is phase locked to reference pulses derived from a main (60 Hz) power source and which is capable of relatively stable operation, even in the presence of synchronization signal timing variations. Also disclosed therein is a dynamic framing circuit which adaptively adjusts the position of the scanning raster to conform with the actual position of film frames being scanned so that a stationary display is achieved. Dynamic framing is accomplished by deriving synchronization pulses from the synchronization track on the film and comparing these pulses with reference pulses derived from the main power source of the overall system. An error or compensation signal is thereby generated which is representative of the time difference between the received synchronization pulses and the reference pulses. This error signal is applied to the vertical scanning circuitry of the electronic film scanner to position the raster in proper alignment with the frame. The raster is positioned during the vertical flyback interval to prevent discontinuity in the displayed picture.

The described system has brought about substantial vertical stability improvement in the performance of an electronic video recording system. However, a residual type of jitter has been found present when this system is employed. This jitter has been perceived to be most prevalent at the bottom of a displayed picture; i.e., the displayed picture has an inherent instability that is manifested by a noticable movement of the lower portion of the picture. Such instability is believed to result from variations in film velocity during scanning of a particular frame. When this occurs, the distance the film travels during a particular field scan varies from one scan period to the next. The dynamic framing circuit aligns only the top of the scanning raster with the top of each film frame. Variations in film velocity during the frame enables the bottom position of the frame to constantly change, causing the appearance of a jitter.

It is accordingly one object of this invention to eliminate the type of residual jitter found present near the bottom of displayed pictures presented by an electronic video recording system.

SUMMARY OF THE INVENTION

The present invention is applicable to an apparatus for scanning a film having a succession of frames along its length, the system including a film transport for moving the film at a substantially uniform rate past a scanning position, means for scanning the frames with a beam at the scanning position and means for initially registering each frame to be scanned with the scanning beam. The invention comprises an improved system for continuously retaining registration between a particular frame being scanned and the scanning beam.

In accordance with the invention there are provided means for continuously sensing changes in the velocity of the film during scanning of the particular frame and for generating a velocity error signal indicative of such changes. Further means are provided for accumulating values of the velocity error signal to produce a displacement error signal representative of the distance by which velocity changes have displaced the particular film frame with respect to its initial registration with the scanning beam. Finally, means are provided for continuously correcting the scanning beam position in accordance with the displacement error signal.

In a preferred embodiment of the invention, the correcting means includes an auxiliary deflection yoke for the scanning tube, the yoke receiving correction signals from both a dynamic framing circuit and the displacement error circuit.

Further features and advantages of the invention will become more readily apparent from the following detailed description when taken in conjunction with the accompanying drawings.

DESCRIPTION OF THE PREFERRED EMBODIMENT

Figure 1:
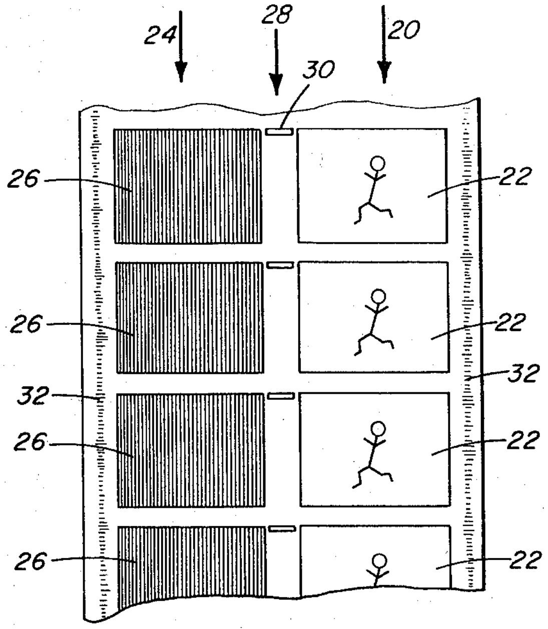
FIG. 1 is a fragmentary view of a typical film format for color picture information useful in the invention.

Before considering the operation of a system embodying the invention, it is useful to consider a typical film format usable therewith. A film format for color programming material is depicted in FIG. 1 and includes a luminance track 20 comprised of a succession of frames 22 of black and white pictures, and color track 24 comprised of a succession of encoded frames 26 each associated with a respective frame 22 and each containing coded chroma information. A sync track 28 is provided on a longitudinal strip intermediate the two successions of frames and includes a plurality of light transmissive apertures 30 each aligned with the upper edges of respective frames 22 and 26. One or more sound tracks 32 along one or both edges of the film provide monaural or binaural audio information for reproduction along with the picture information. These audio tracks can be of magnetic or photographic form.

In order to employ a standard size film format for both monochrome and color picture reproduction, the monochrome film can be produced with two adjacent frames across the width of the film corresponding in position to the frames 22 and 26. The adjacent successions of frames are parts of two separate picture tracks and, thus, two monochrome tracks can be provided on the single film. The sync track 28 is common to both, and an associated sound track can be provided for each picture track, one along each edge.

Figure 2:
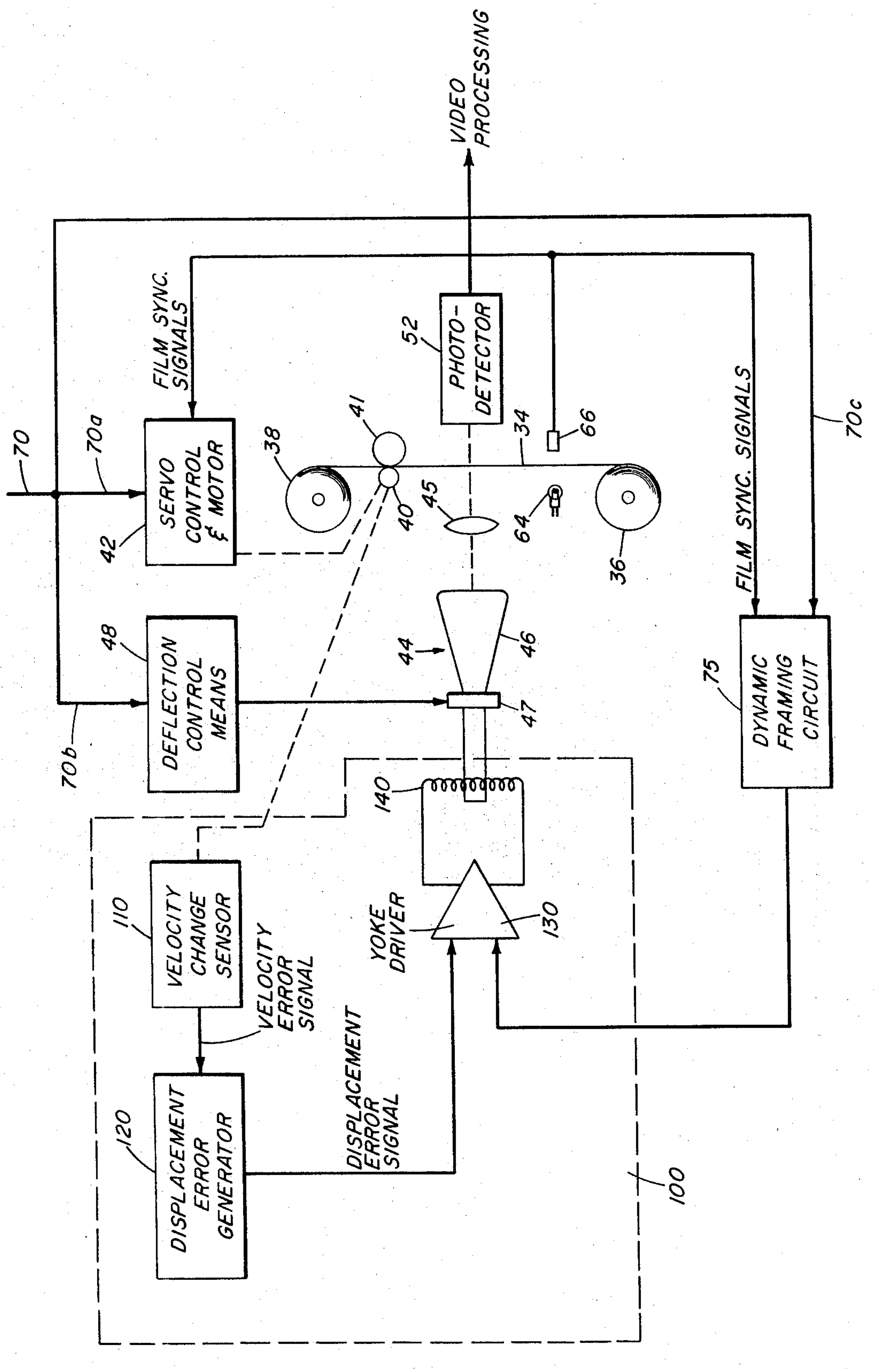
FIG. 2 is a diagramatic representation of a film reproducing apparatus which embodies the improvement of the present invention.

Reproducing apparatus for the film described in FIG. 1 (either black and white or color) and embodying the improvement of the present invention is shown in diagramatic form in FIG. 2. The apparatus shown is operative to electronically scan and continuously move film of the type described above, and to derive therefrom video and audio signals for reproduction of the program information recorded on the film. The construction and operation of the EVR system itself, together with a discussion of electronic video recording in general, is described in detail in the above-referenced IEEE Spectrum article. A brief discussion of the playback system should suffice for present purposes. In FIG. 2, a film 34 which may contain black and white or color program material is carried by a supply reel 36 and takeup reel 38 of a film transport, which includes a drive capstan 40 and an associated servo control and motor 42. The film transport is operative to move the film 34 continuously at a substantially constant speed past the scanning position where the film is scanned by a flying spot scanner 44 and associated optics 45. The flying spot scanner includes, inter alia, a cathode ray tube 46 having horizontal and vertical deflection means 47 that are driven by associated deflection control circuitry 48. The scanner 44 is operative to scan a spot of light across the frames of film 34 in a raster pattern controlled by the deflection means 47 in well known manner.

One or more photodetectors 52 are disposed on the opposite side of film 34 from cathode ray tube 46 to receive light scanned therethrough and to produce output signals representative of the amount of light transmitted through the film. The photodetector output signals are applied to video processing circuitry (not shown) which provides video output signals for application to a television receiver or other utilization means for picture reproduction. In the case of black and white picture material, a single photodetector, such as a photomultiplier tube, is employed to generate video signals. For the color picture format of FIG. 1, two photodetectors are employed, each operative to sense light scanned across respective frames 22 and 26 to provide respective output signals representing luminance and chrominance information. The signals are then applied to the video processor for production of a composite video output signal for application to a television receiver or the like.

Sound track sensing means (not shown) are typically disposed adjacent to respective sound tracks of the film 34 to provide audio signals to an audio processor (not shown), the audio processor providing audio output signals for application to utilization apparatus such as a television receiver.

In the above-referenced co-pending application of Horowitz and McMann, there is disclosed a technique for reducing vertical jitter in a film scanning system of the type being described. The operation of that technique is illustrated in simplified form in FIG. 2. Signals derived from the main power source (typically 60 Hz) are depicted as being available on line 70. The transport servo system 42 is phase locked to the main power source as depicted by the branch **70*a*. A lamp 64 or other suitable light source is disposed with respect to the sync track on the film 34 to transmit light through the apertures thereon, these light pulses being received by a photosensor 66 such as a phototransistor. The film sync signals are applied to the servo control circuitry 42 to form a phase-locked loop arrangement. With this arrangement, the motor is constrained to operate such that the average film sync pulse frequency is maintained at precisely the reference frequency. Thus, for example, if the mains frequency were exactly 60 Hz, this servo control circuitry would continuously control the motor speed such that exactly 60 sync pulses (60 frames) pass the detector 66** each second. This constraint may result in continuous slight variations in the film speed.

The scanning synchronization is also determined from the mains reference as is depicted by the branch line **70*b*. If the reference position of the scan were not adjusted to compensate for film speed variations (or variations in separation between frames), the scanning of successive frames would have a difference in registration that would result in an apparent jitter in the ultimately displayed picture. To improve this condition, the referenced application discloses a dynamic framing circuit that compares the film sync signal to mains reference signals that are received over a branch line 70***c*. The timing difference between these signals is related to the amount by which the scan reference position is out of alignment with the frame reference position. The dynamic framing circuit 75 monitors this timing difference and generates a correction signal that is applied, via a yoke driver 130, to an auxiliary vertical deflection yoke 140 which adjusts the reference position of the scan to compensate for alignment errors. This correction signal tends to properly register the beginning of each field scan with the top of each new frame being scanned. Unfortunately, variations in the velocity of the film during scanning of the frames causes registration to be lost as the scanning of the frame progresses. This phenomenon results in a jitter that is most noticable to a viewer at the bottom of a displayed picture (where misregistration is generally maximized).

Up to this point, the description of FIG. 2 has dealt with a conventional electronic video recording system and with a technique for vertical stabilization of such a system that is disclosed in the referenced co-pending application. It should be emphasized again that the description of these systems is simplified herein for purposes of illustration, and reference is made to the co-pending application for a more complete description thereof. The block 100, shown in dashed enclosure in FIG. 2, includes elements of the present invention that are directed to solving the residual jitter that remains when using a dynamic framing technique of the type described. A velocity change sensor 110 continuously monitors changes in film velocity during scanning and generates a velocity error signal indicative of such changes. The velocity error signal is received by a displacement error generator 120 which translates cumulative velocity error signals into signals which indicate displacement error as between the scanning beam and the frame being scanned. The displacement error signal is applied to yoke driver 130 which drives the auxiliary vertical deflection yoke 140 in such a manner as to continuously compensate for calculated displacement errors. This technique, in conjunction with the correction afforded at the beginning of the frame by a dynamic framing circuit, results in a displayed picture that is relatively free of vertical jitter.

Figure 3:
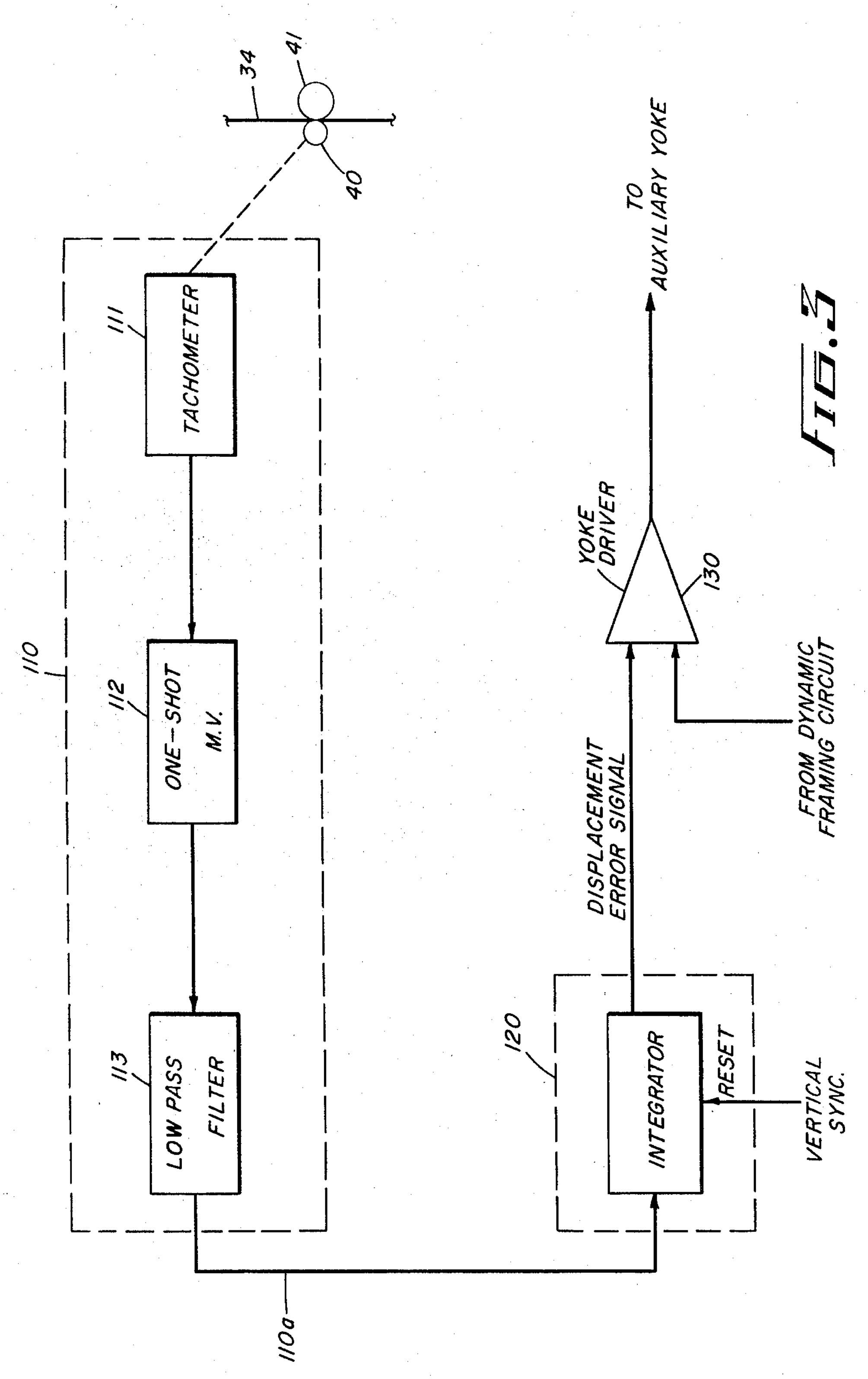
FIG. 3 is a block diagram of an embodiment of the present invention.

Referring to FIG. 3, there is shown a more detailed block diagram of the invention. The velocity change sensor 110 includes a tachometer 111 that may, for example, be optically coupled to the capstan 40 that drives the film in conjunction with a pressure roller 41. It should be pointed out that other suitable means of monitoring film velocity can be used including, if desired, a sensor that would monitor a special sync track on the film. From a practical standpoint, however, a technique such as the present one which indirectly monitors film velocity is preferred. The tachometer 111, which may be of a commercially available type, generates a pulse train that varies in frequency and pulse width in proportion to the angular velocity of the capstan and therefore in approximate proportion to the velocity of the film.

A pulse-averaging FM demodulator, consisting of a one-shot multivibrator 112 is series with a lo-pass filter 113, is utilized to obtain a signal that is a function of changes in film velocity. The one-shot 112 forms short fixed-width output pulses that are triggered by the onsets of the pulses it receives. In this manner, the pulse train output of the tachometer is transformed into a pulse train which maintains its original frequency but has a constant pulse width. The velocity variation information is then extracted from the pulse train by lo-pass filtering. The theory underlying pulse averaging demodulation is well known, but can be reviewed briefly as follows: From the standpoint of spectral analysis, the average component of a pulse train depends on the pulse amplitude and duty cycle. For a constant pulse amplitude and width, the average component of a pulse train varies in direct proportion to the pulse rate. The lo-pass filter rejects the fundamental and harmonics of the pulses and recovers the relatively low frequency variations in the average component. If the pulse rate is increased, the amplitude of the velocity error signal increases, whereas if the pulse rate decreases, the amplitude of the velocity error signal decreases. Thus, the A.C. component of the velocity error signal 110*a* (FIG. 3) represents the deviation of film velocity from its nominal value.

The signal 110*a* is integrated during each frame to derive a displacement error that is applied to the auxiliary yoke driver 130. The scanner's vertical synchronizing signal is used to reset the integrator so that new displacement error signals are formed during each frame. In this embodiment, both the dynamic framing correction signal and displacement error signal are applied to the auxiliary yoke driver 130.

Figure 4:
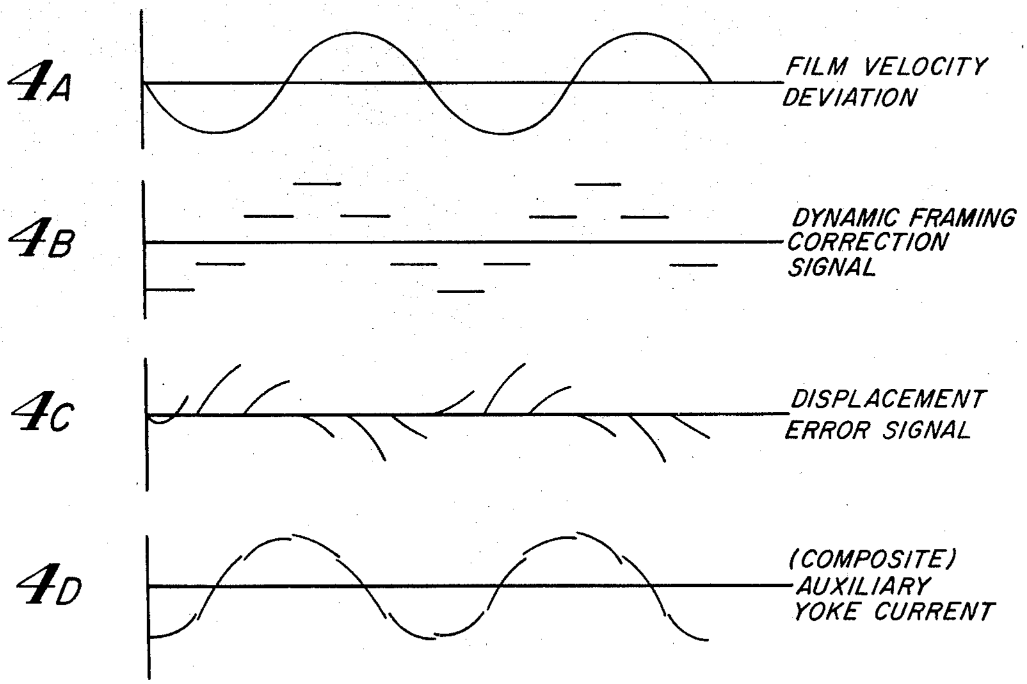
FIG. 4 is a set of waveforms useful in describing the operation of the systems of FIG. 2 and FIG. 3.

Referring to FIG. 4, there are shown approximate curves of measurements taken using the setup of FIGS. 2 and 3. Waveform 4A represents a film velocity deviation of 1% that was experimentally introduced at a frequency of 10 Hz. The waveform 4B is the dynamic framing correction signal that is generated for this deviation by the dynamic framing circuit 75. There is one correction signal per frame, there being about six frames per deviation cycle for a 10 Hz. deviation. Waveform 4C is the measured displacement error that is still present when dynamic framing correction is being utilized. The displacement error is practically zero at the beginning of each new frame (due to dynamic framing correction), but generally builds up to a substantial value during the frame. Waveform 4D is the composite correction signal from the auxiliary yoke driver 130 and is approximately sinusoidal to match the deviation signal. The use of this signal to drive the auxiliary yoke was found to virtually eliminate vertical jitter.

We claim:

1. In an apparatus for scanning a film having a succession of frames along its length, said apparatus including a film transport for moving said film at a substantially uniform rate past a scanning position, means for scanning said frames with a beam at the scanning position, and means for initially registering each frame to be scanned with the scanning beam, an improved system for continuously maintaining registration between a particular frame being scanned and the scanning beam comprising:

means for continuously sensing changes in the velocity of said film during scanning of the particular frame and for generating a velocity error signal indicative of such changes;

means for accumulating values of said velocity error signal to produce a displacement error signal representative of the distance by which velocity changes have displaced the particular film frame with respect to its initial registration with the scanning beam; and means for continuously correcting the scanning beam position in accordance with the displacement error signal.

2. The system in accordance with claim 1 wherein said means for sensing velocity includes:

a tachometer which generates an output pulse train having a pulse rate proportional to the velocity of said film; and means for determining changes in the pulse rate output of said tachometer.

3. The system in accordance with claim 1 wherein said means for accumulating values of said velocity error signal to produce a displacement error signal comprises an integrator.

4. The system in accordance with claim 3 wherein means are provided for resetting said integrator at the beginning of each new film frame.

5. The system in accordance with claim 1 wherein said correcting means comprises an auxiliary deflection means for said scanning means, and means for applying said displacement error signal to said auxiliary deflection means.

6. The system in accordance with claim 5 wherein said means for initially registering each frame to be scanned with the scanning beam comprises a dynamic framing circuit, the output of said dynamic framing circuit being applied to said auxiliary deflection means.

7. The system in accordance with claim 2 wherein said film is driven by a capstan to which said tachometer is mechanically coupled.

8. An electronic film scanning system comprising:

a film transport for moving said film at a substantially uniform rate past a scanning position, said film having a succession of data bearing frames and a plurality of synchronization marks along its length;

electronic scanning means operative to scan said frames with a scanning beam as said film is conveyed past said scanning position;

photodector means for sensing light from said electronic scanning means transmitted by said scanned film frames and for providing an electrical signal in response thereto;

video processing means operative in response to said electrical signal to provide an output signal representative of data contained in said scanned film frames;

means for sensing said synchronization marks on said film and for providing output synchronization signals indicative thereof;

means for providing reference signals at the power line frequency of the system;

a dynamic framing circuit operative in response to said film synchronization signals and said reference signals to produce a dynamic framing signal for initially registering each frame to be scanned with the scanning beam;

servo control means coupled to said film transport apparatus and operative in response to said film synchronization signals and said reference signals to cause said film to be moved at a velocity at which said film synchronization pulses are phase-locked to the power line frequency;

means for continuously sensing changes in the velocity of said film during scanning of a particular frame and for generating a velocity error signal indicative of such changes;

means for accumulating values of said velocity error signal to produce a displacement error signal representative of the distance by which velocity changes have displaced the particular film frame with respect to its initial registration with the scanning beam; and means for continuously correcting the scanning beam position in accordance with the displacement error signal.

9. The system in accordance with claim 8 wherein said means for sensing velocity includes:

a tachometer which generates an output pulse train having a pulse rate proportional to the velocity of said film; and means for determining changes in the pulse rate output of said tachometer.

10. The system in accordance with claim 8 wherein said means for accumulating values of said velocity error signal to produce a displacement error signal comprises an integrator.

11. The system in accordance with claim 10 wherein means are provided for resetting said integrator at the beginning of each new film frame.

12. The system in accordance with claim 8 wherein said correcting means comprises an auxiliary deflection means for said scanning means, and means for applying said dynamic framing signal and said displacement error signal to said auxiliary deflection means.

* * * * *